(12) United States Patent
Taniai et al.

(10) Patent No.: US 6,295,179 B1
(45) Date of Patent: Sep. 25, 2001

(54) LIBRARY SYSTEM COMMUNICATION AND CONTROL ARRANGEMENT

(75) Inventors: Takamasa Taniai, Kawasaki; Yasuhiko Hanaoka, Tama; Yuzuru Koga, Tokorozawa, all of (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 08/311,371

(22) Filed: Sep. 23, 1994

Related U.S. Application Data

(63) Continuation of application No. 07/601,728, filed as application No. PCT/JP90/00854 on Jun. 29, 1990, now abandoned.

(30) Foreign Application Priority Data

Jun. 30, 1989 (JP) .................................................... 1-167027

(51) Int. Cl.[7] .................................................. G11B 15/675
(52) U.S. Cl. .............................................. 360/92; 369/34
(58) Field of Search .................................. 369/34, 30, 36, 369/33; 360/98.05, 92, 98.04

(56) References Cited

U.S. PATENT DOCUMENTS

| | | | | |
|---|---|---|---|---|
| 4,766,581 | * | 8/1988 | Korn et al. | 369/34 |
| 4,893,293 | * | 1/1990 | Enod et al. | 369/34 |
| 4,989,191 | * | 1/1991 | Kuo | 369/33 |
| 5,025,432 | * | 6/1991 | Naito | 369/34 |

FOREIGN PATENT DOCUMENTS

| | | | |
|---|---|---|---|
| 61-120236 | * | 11/1984 | (JP) . |
| 61-234425 | * | 4/1985 | (JP) . |
| 8805593 | * | 7/1988 | (WO) . |

* cited by examiner

Primary Examiner—Jefferson Evans
(74) Attorney, Agent, or Firm—Armstrong, Westerman, Hattori, McLeland & Naughton

(57) ABSTRACT

A library system in which a recording and reproducing unit loads a recording medium after an accessor has retired from the recording and reproducing unit by exchanging data between the recording and reproducing unit and the accessor on the occasion that the recording and reproducing unit loads a recording medium carried from the accessor to the recording and reproducing unit. Moreover, the library system has an object to realize communication of the necessary data between the recording reproducing unit and accessor without increase of a load of the director for controlling the recording and reproducing unit and accessor. The library system has a store house (51) for storing a large number of recording medium, a recording and reproducing limit (52) for realizing read and write operation to a recording medium, an accessor (53) for transferring recording medium between the store house (51) and recording and reproducing unit (52) and a director (54) for controlling the library system (20) as a whole including the recording and reproducing unit (52) and accessor (53) and moreover a third communication means (55) for transmitting instructions between the recording and reproducing unit (52) and accessor (53).

17 Claims, 14 Drawing Sheets

FIG.I  PRIOR ART
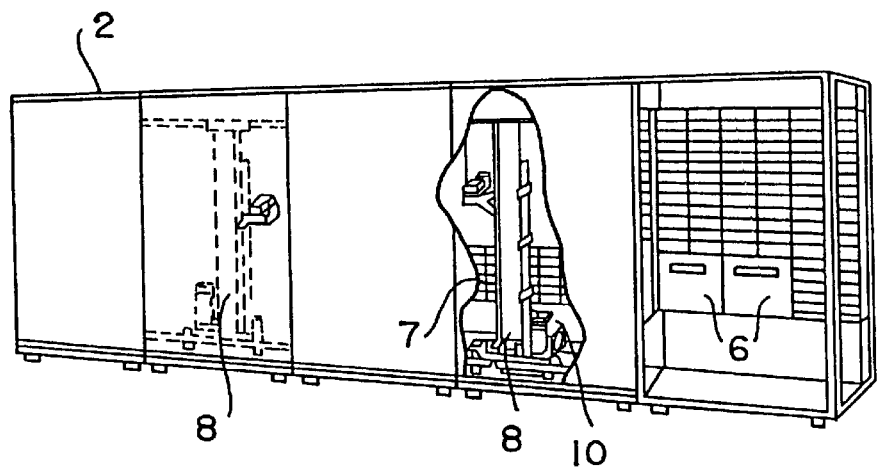
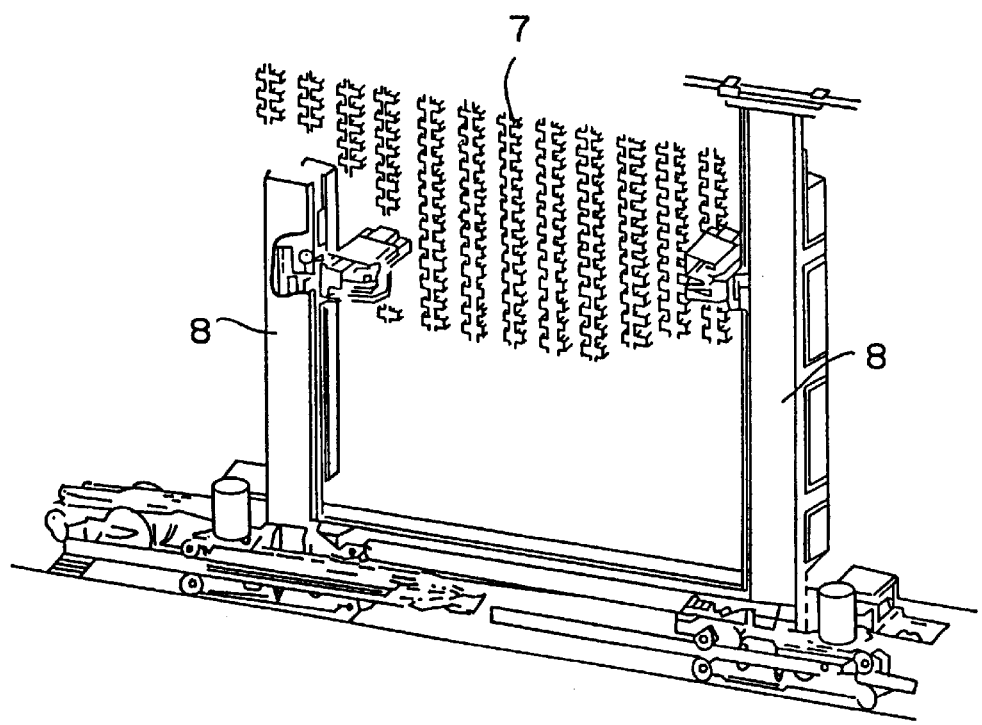
FIG.2  PRIOR ART

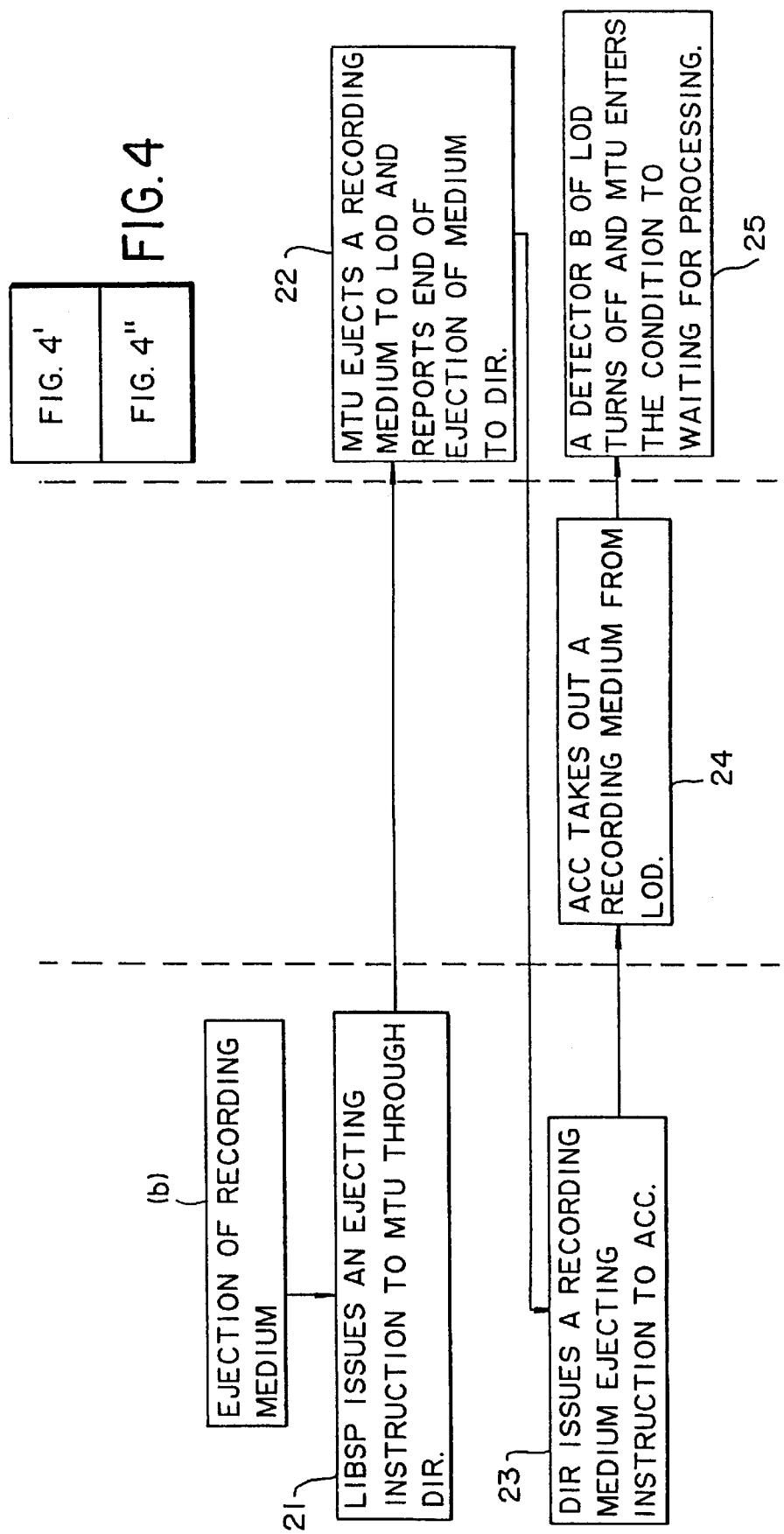
FIG. 4" PRIOR ART

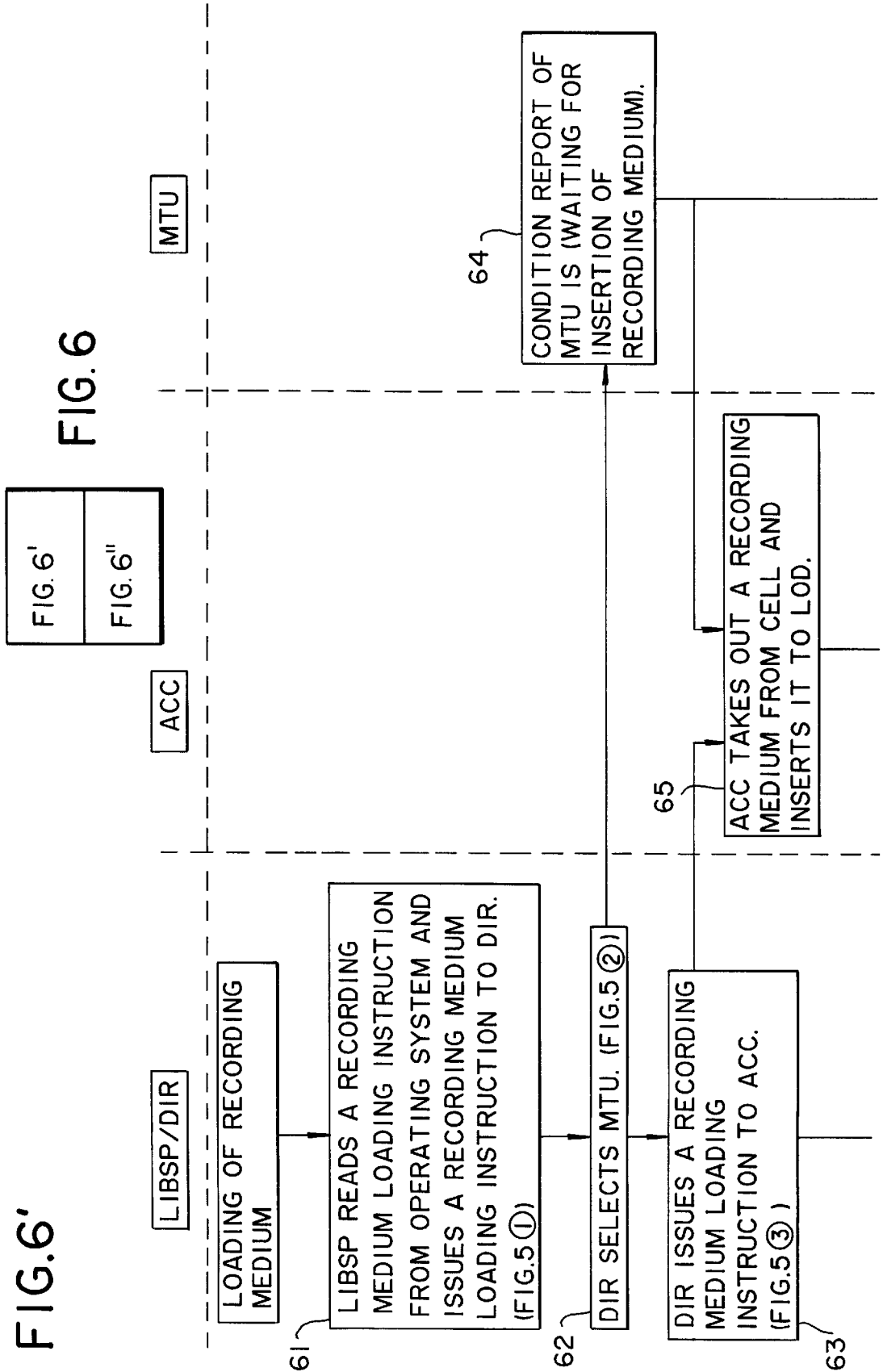

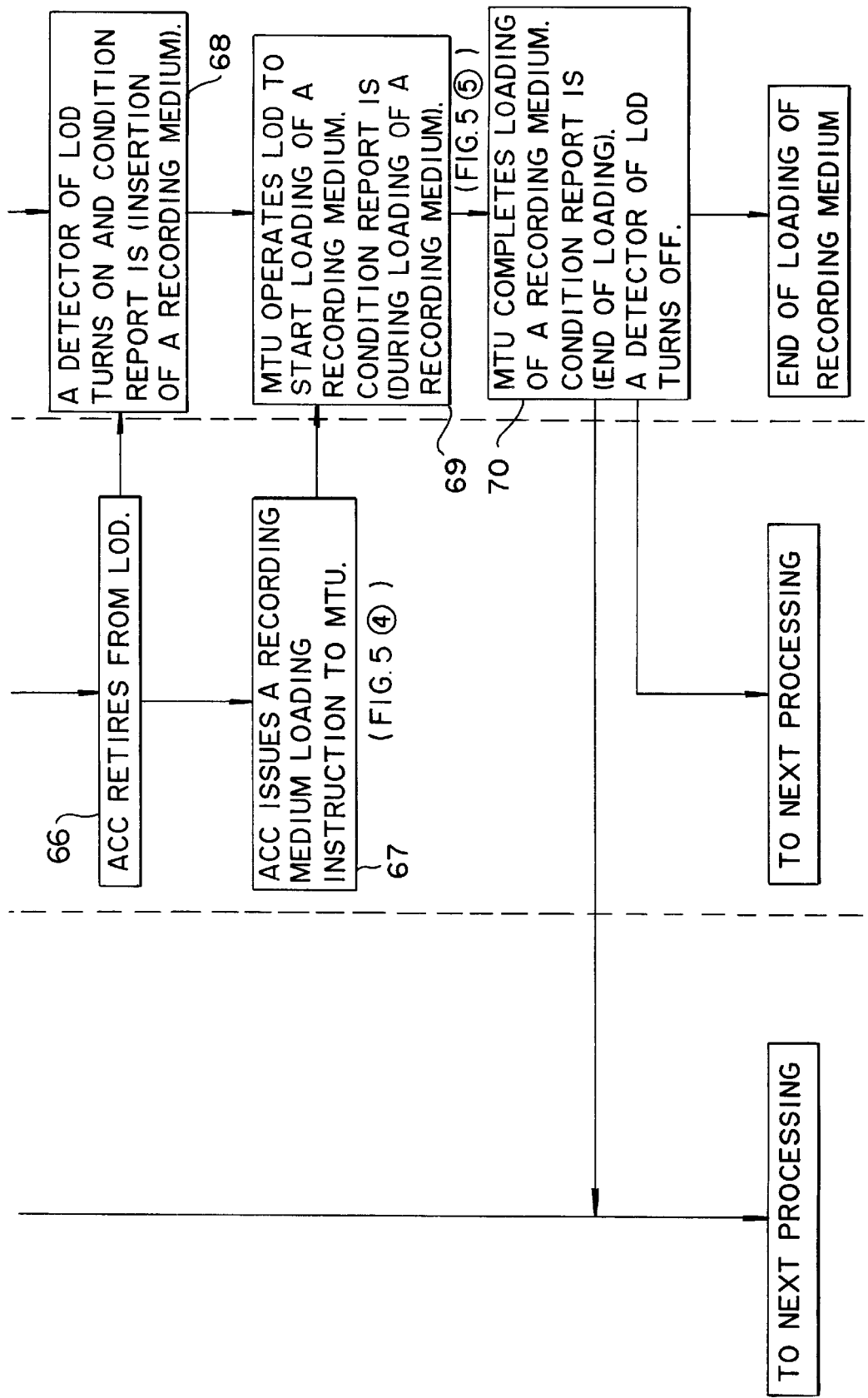
FIG. 6"

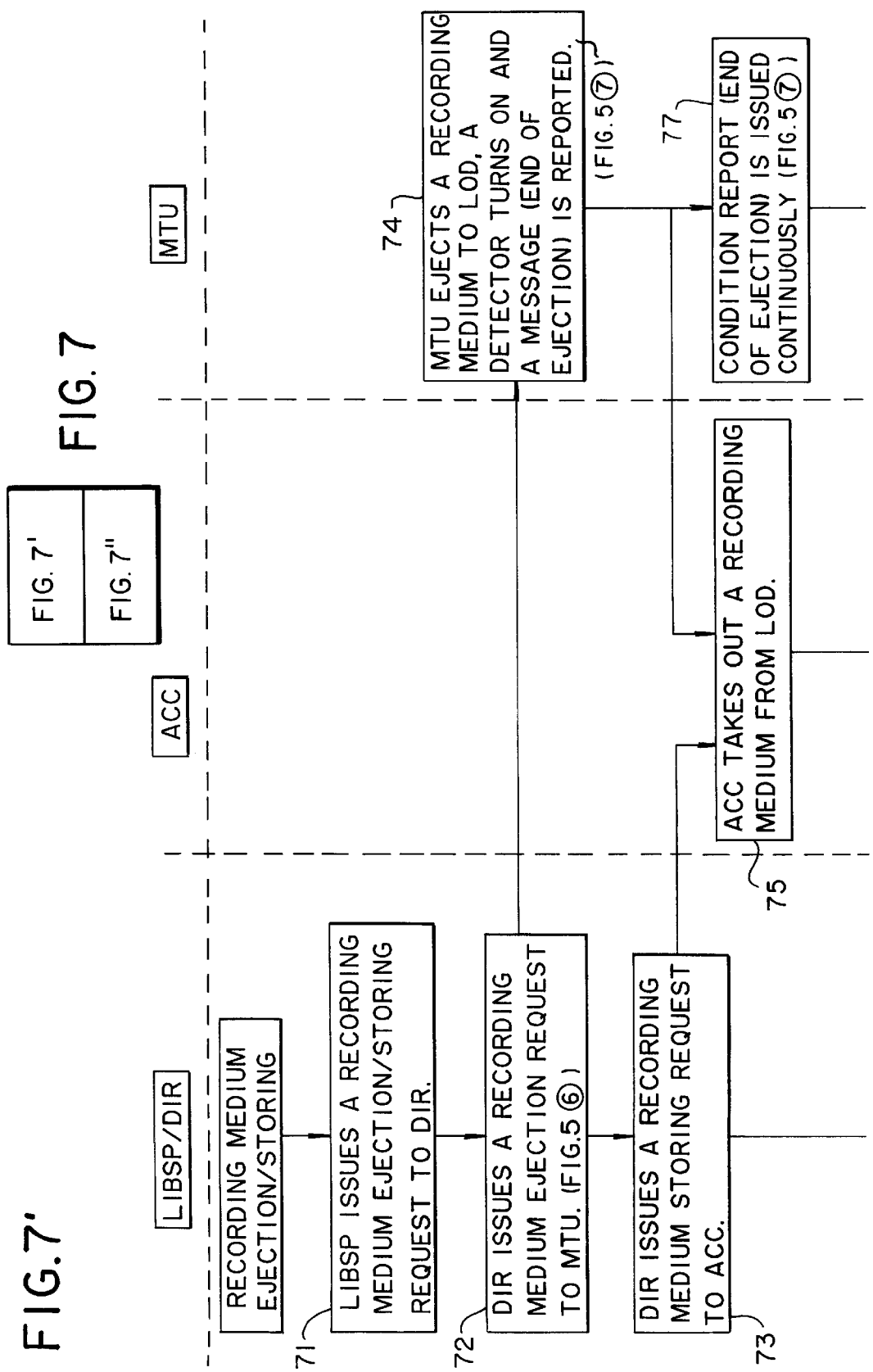

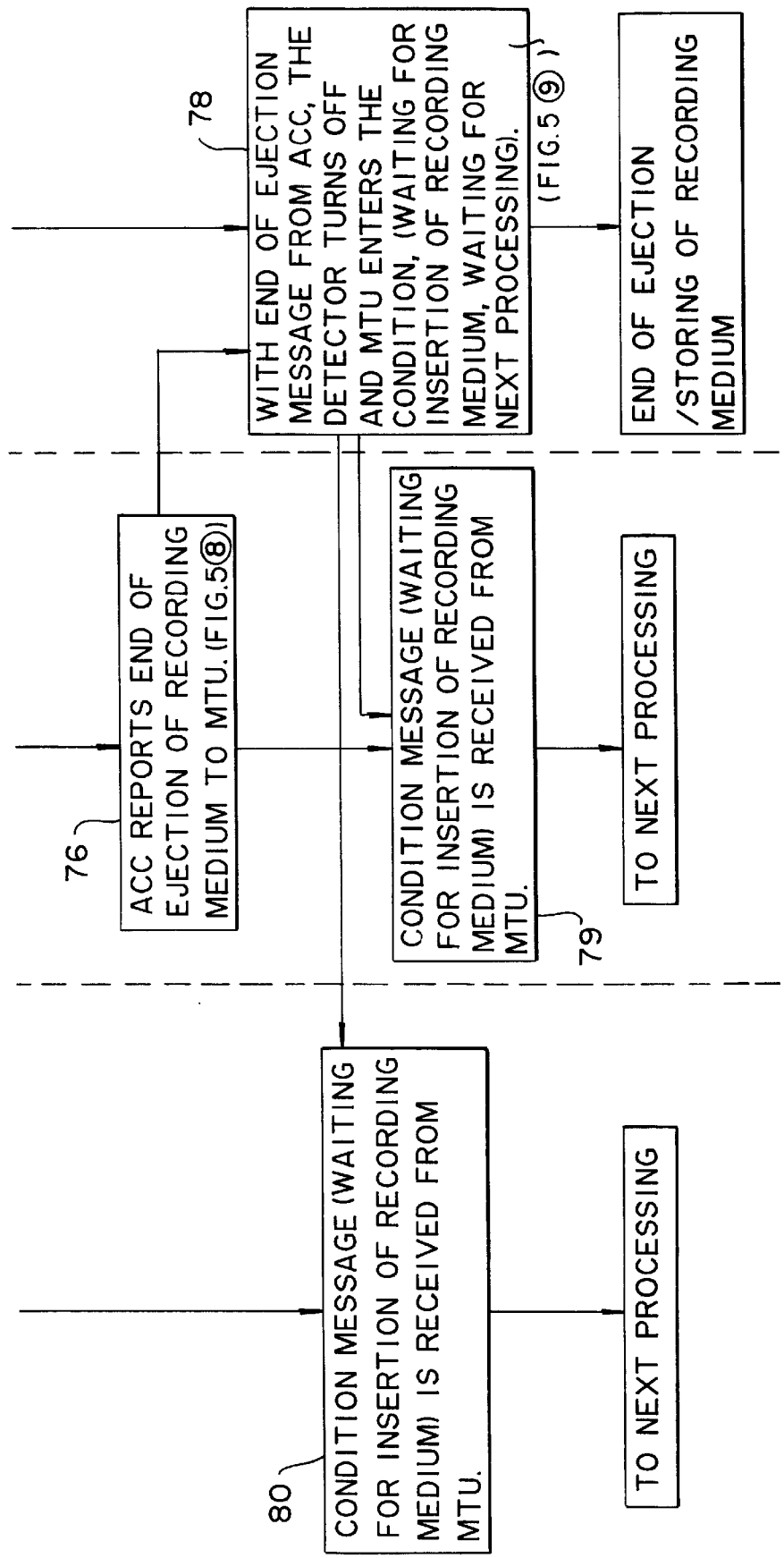
FIG.7"

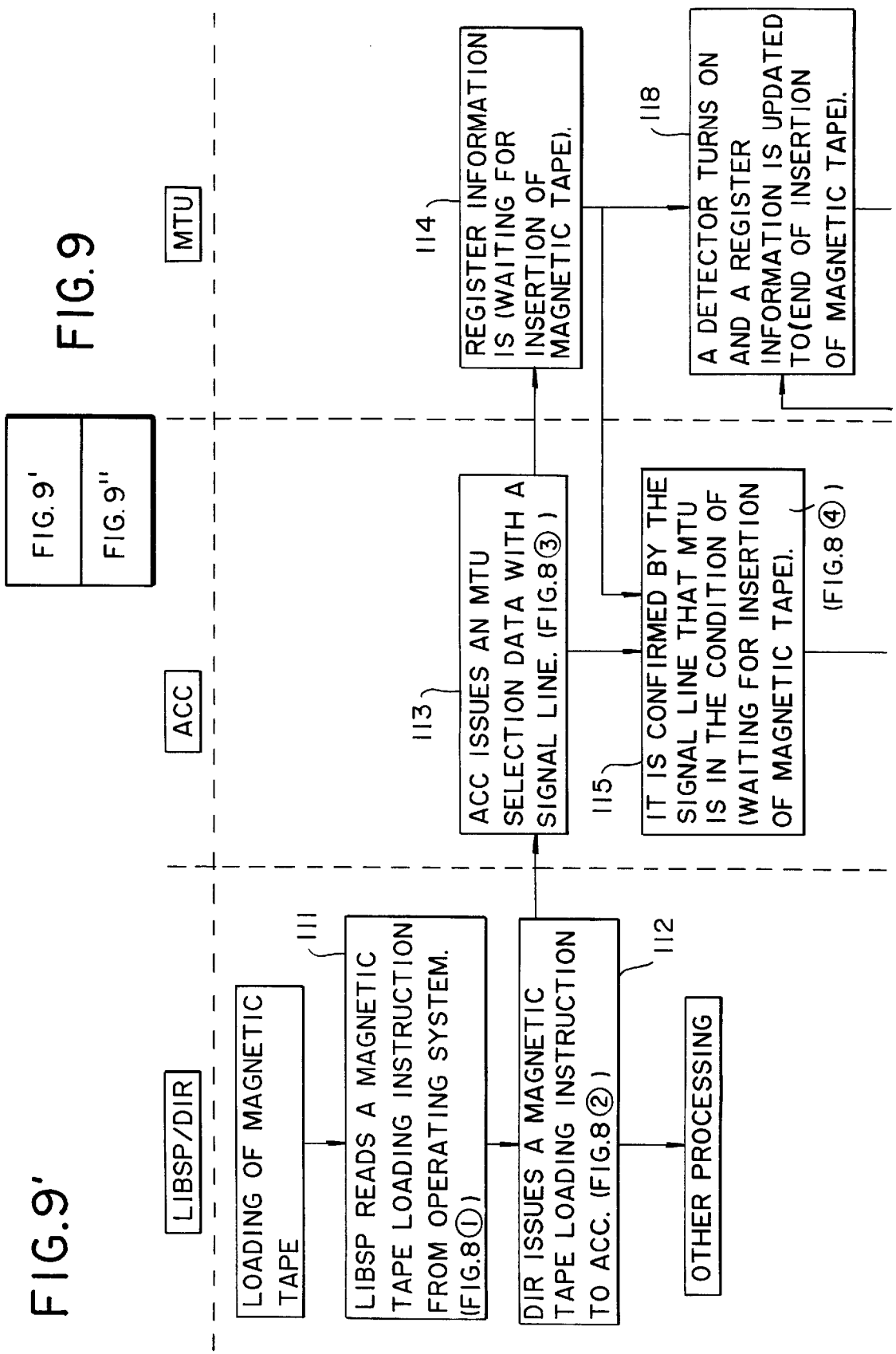

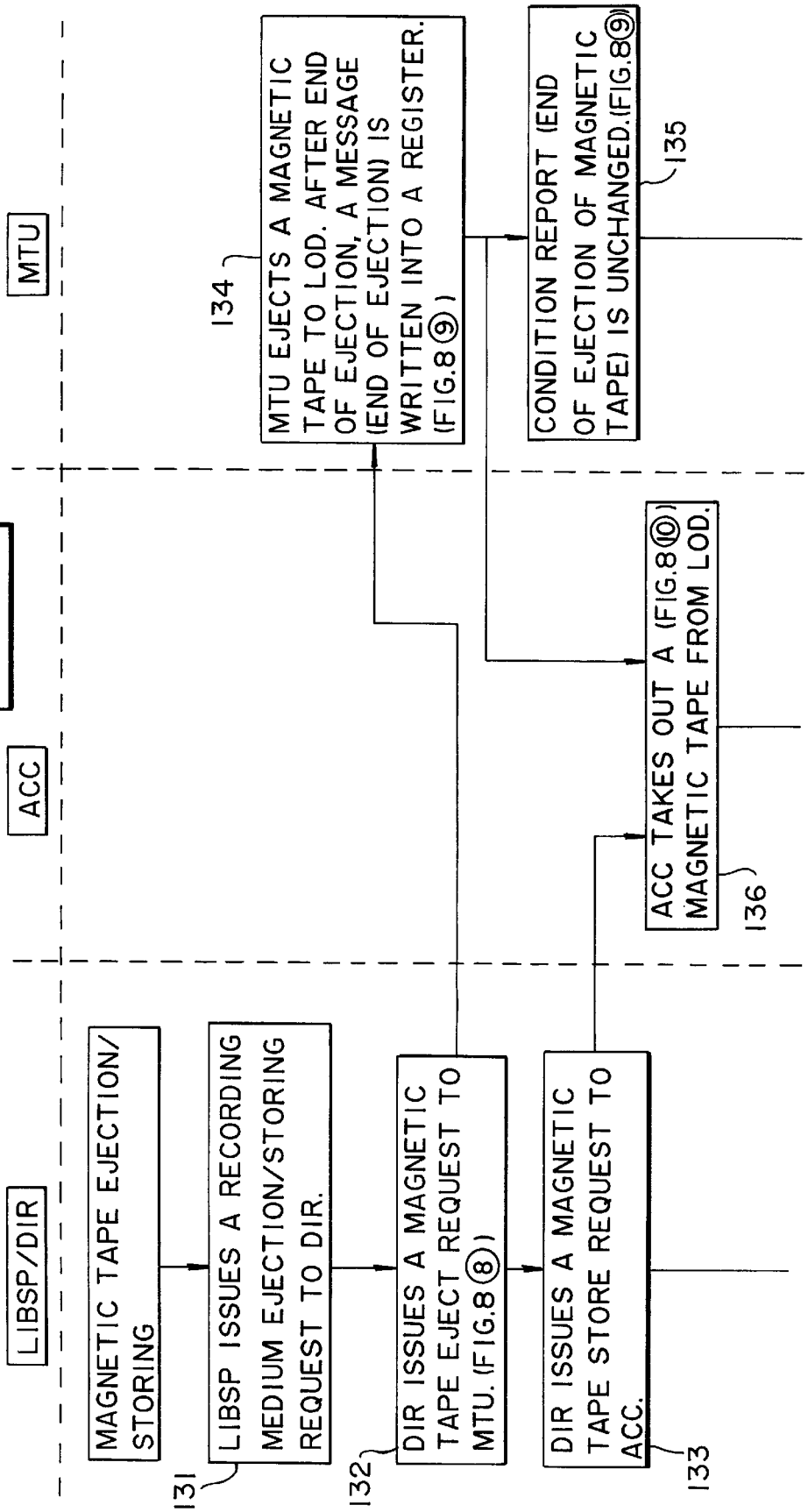

LIBRARY SYSTEM COMMUNICATION AND CONTROL ARRANGEMENT

This application is a continuation application of application Ser. No. 07/601,728 filed May 21, 1992, now abandoned, which is a 35 USC 371 filling based on PCT/JP90/00854, filed Jun. 29, 1990.

FIELD OF THE INVENTION

The present invention relates to a library system which is capable of storing a large number of recording medium within a store house and recording and reproducing data to or from a recording medium by automatically loading the recording medium to a recording and reproducing unit from a store house and ejecting the medium therefrom without operator's intervention.

In more detail, the library system of the present invention comprises a store house for storing a large number of recording mediums, for example, of cartridge type, a recording and reproducing unit for recording and reproducing data to or from the recording mediums and a carrying the apparatus for carrying recording mediums between the store house and recording and reproducing unit, and the present invention particularly relates to a method of controlling transfer of a recording medium from the carrying apparatus to the recording and reproducing unit and of carrying the recording medium from the recording and reproducing unit to the carrying apparatus.

BACKGROUND OF THE INVENTION

In these years, a computer system deals with a numerous quantity of data. Therefore, a large scale and high speed disk unit is used for ordinary jobs and a magnetic tape or optical disk unit is generally used for storing of data. With increase of data, such recording mediums increases in number. As a result, an operator is required to take much labor and longer time to load the target recording medium to the recording and reproducing unit.

Therefore, reduction in size of the recording medium itself and automatic loading, ejection and storing of the recording medium are required and, moreover, a library system which is capable of storing a large number of small-sized recording medium and realizing automatic loading and ejection of recording medium has been developed. Such a library system is disclosed, for example, in Japanese Laid-open Patent Application No. 62-267175.

FIG. 1 and FIG. 2 show structures of a library system. FIG. 1 shows a structure of the library system as a whole, while FIG. 2 shows a structure of carrying apparatus of the inside of the library system. The library system is formed by a rectangular parallelopiped cabinet which comprises therein a store house 7 for storing a large number of cartridge type recording mediums 10, a recording and reproducing unit 6 for recording and reproducing data for recording mediums 10 and a carrying apparatus 8 for carrying recording mediums 10 between the store house 7 and recording and reproducing unit 6.

In more detail, the store house 7 provides a plurality of square shelves for storing cartridge type recording mediums 10 and this shelf is arranged to the front and rear surface walls of the inside of the library system 2. The carrying apparatus 8 picks up a recording medium 10 designated from a control unit in the store house 7 and then loads it in the recording and reproducing unit 6, or transfers and stores a recording medium 10 exhausted from the recording and reproducing unit 6 up to the store house 7. Such a carrying apparatus 8 is provided, for example, in two units within the library system 2 and these are alternately used for shortening the access time to the recording mediums 10. The recording and reproducing unit 6 is provided, for example, with a plurality of units which are on the same plane as a part of the shelf of the store house 7.

The accessor 8 also loads the recording mediums 10 to the recording and reproducing unit 6, just like storing the recording mediums 10 into the store house 7.

FIG. 3 is a control block diagram of the library system of the prior art. In this figure, the reference numeral 1 designates a library system control system in the side of host unit and 2 designates the library system main body.

The library system control system 1 in the side of the host unit comprises an operating system (OS) 4, an operator console 3 and a library support program (LIBSP) 5.

The library system 2 comprises, as explained previously, a recording and reproducing unit 6 for recording or reproducing data to or from a recording mediums, a store house 7 for storing recording medium, an accessor (ACC) for carrying recording mediums between the store house 7 and the recording and reproducing unit 6, and a director (DIR) 9 for controlling the library system 2 as a whole including the recording and reproducing unit 6 and carrying apparatus 8.

The recording and reproducing unit 6 comprises a loading unit (LOD) 6a for dealing with recording mediums for the carrying apparatus 8, a read/write processing unit (R/W) 6b for writing or reading data to a recording medium after loading the medium to the recording and reproducing position with the loading unit 6a, a detector 6aa for notifying that the carrying apparatus 8 makes access to the loading unit 6a and is separated therefrom and a detector 6ab for detecting that a recording medium is placed within the loading unit 6a or not and notifying it to the read/write processing unit 6b.

The carrying apparatus 8 comprises an carrying mechanism 8a for carrying recording mediums between the read/write processing unit 6b and the store house 7 and a controller 8b for controlling such carrying mechanism 8a.

Hereafter, the loading and ejecting operations of recording mediums for this library system 2 will be explained. FIG. 4 indicates recording medium loading and ejecting operations.

First, when a recording medium loading request is issued from OS 4 to a console 3 and LIBSP 5, it reads such request (step 11) and issues a loading instruction (step 12) to the carrying apparatus 8 through the director 9 of library system 2.

The carrying apparatus 8 takes out the requested recording medium from the store house 7 by operating the carrying mechanism 8a, inserts such medium to the loading unit 6a of the recording and reproducing unit 6, causes the loading unit 6a to insert the recording medium into the loading unit 6a and thereafter causes the carrying mechanism 8a to be retired (step 14).

The recording and reproducing unit 6 notifies, at the time of inserting a recording medium carried by the carrying apparatus 8, that the carrying mechanism 8a has entered the loading unit 6a to the read/write processing unit 6b (step 15) when the detector 6aa detects that the carrying mechanism 8a has entered the loading unit 6a and thereby turns ON, and then notifies that the loading unit 6a has accepted the recording medium to the read/write processing unit 6b when the detector 6ab has detected that the recording medium is perfectly loaded and thereby turns ON. When the carrying mechanism 8a withdraws from interior of loading unit 6a, the detector 6aa turns OFF, notifying that the transfer mechanism 8a has retired to the read/write processing unit 6b (step 16).

The recording and reproducing unit 6 operates the loading unit 6a and loads a recording medium to the read/write processing unit 6b (step 17), after the recording medium has been transferred to the loading unit 6a and the carrying mechanism 8a for retired from the loading unit 6a, namely after the detector 6aa turns OFF.

Thereafter, the read/write processing unit 6b executes the read/write operation for the recording medium loaded under the control of director 9. When the read/write processing is completed, the recording medium is ejected from the loading unit 6b and is then stored in the store house 7.

Control for ejecting a recording medium is carried out as explained hereafter.

When the read/write processing for a certain recording medium is completed, LIBSP 5 issues a recording medium eject instruction to the director 9 of the library system 2 and the director 9 sends such instruction to the recording and reproducing unit 6 (step 21).

The recording and reproducing unit 6 having received the eject instruction ejects a recording medium to the loading unit 6a from the read/write processing unit 6b and issues a message at the end of the ejection to the director 9 (step 22). The director issues, upon reception of the message, a medium eject instruction to the carrying apparatus 8 (step 23).

The recording and reproducing unit 6 turns OFF the detector 6ab when the recording medium is taken out from the loading unit 6a by the transfer means 8, notifies that the recording medium is ejected from the loading unit 6a to the read/write processing unit 6b, setting the read/write processing unit 6b to a condition of waiting for a processing instruction, and issues to the director 9 a message indicating the condition of waiting for processing instruction (step 25).

With such a sequence, the carrying apparatus 8 executes the recording medium loading and ejecting operations between the recording and reproducing unit 6 and the store house 7 and, thereby, realizes loading, ejection or storing of the recording medium without an operator's intervention.

Such a conventional library system 2 starts loading of a recording medium of the recording and reproducing unit 6 after detecting by the detectors 6aa and 6ab provided in the unit 6 that a recording medium is loaded and the carrying mechanism 8a enters the loading unit 6a.

However, if a detector 6aa fails due to some reason such that it always becomes OFF, the condition that the carrying mechanism 8a has not entered the loading unit 6a is issued continuously. In case a recording medium is inserted in the loading unit 6a under this condition, the detector 6ab detects that the recording medium is inserted into the loading unit 6a and the output of the detector 6aa is OFF. Therefore, even when the carrying mechanism, 8a is inserted to the loading unit 6a to hold a recording medium, the carrying mechanism 8a is judged to have been withdrawn from the loading unit 6a and the loading unit 6a starts loading a recording medium to the read/write position.

Under this condition, the loading unit 6a tries to move the recording medium to the read/write position in the read/write processing unit 6b, but since the carrying mechanism 8a enters the loading unit 6a and continuously holds the recording medium, the carrying mechanism 8a also enters inside the loading unit 6a together with the recording medium. Thereby, the carrying mechanism 8a engages with the medium inserting port of the recording and reproducing unit 6. Accordingly, even if it is attempted to remove the carrying mechanism 8a from the loading unit 6a, the carrying mechanism 8a can no longer be removed from the loading unit 6a, depending on the manner of engagement of the carrying mechanism 8a with the loading unit 6a. In this case explained above, a fault occurs only in the recording and reproducing unit. However, the carrying apparatus 8 also fails, providing a resultant failure of the system as a whole because the function of the library system as a whole for automatically loading a recording medium stops.

Namely, the library system usually comprises a plurality of recording and reproducing units and, therefore, if a single recording and reproducing unit can no longer be used due to failure, recording or reproducing may be continued using other recording and reproducing units. However, as described above, if the carrying apparatus 8 cannot be used due to failure, a recording medium cannot be loaded to the recording and reproducing unit and the function of the library system as a whole fails.

For ejection of a recording medium, the recording and reproducing unit 6 ejects a recording medium to the loading unit 6a and the carrying mechanism 8a takes out the recording medium from the loading unit 6a. But, if the carrying mechanism 8a cannot pick up a recording medium successfully, it returns the medium to the loading unit 6a and then tries again to pick up the recording medium.

In this case, since the carrying mechanism 8a tries to take out a recording medium, the detector 6ab might sometimes turn OFF. If the detector 6ab turns OFF, the recording medium is judged to have been ejected from the loading unit 6a and, thereby, the recording and reproducing unit 6 is caused to enter the condition of waiting for insertion of a recording medium by the carrying mechanism 8a. When a recording medium is inserted again into the loading unit 6a by the repeated pickup trial, the detector 6aa detects insertion of a recording medium. However, if the detector 6aa fails, it is attempted to load a recording medium to the recording and reproducing unit, even when the carrying mechanism 8a is inserted into the loading unit 6a, as explained previously, to hold a recording medium. Thereby, a problem as explained above also occurs.

DISCLOSURE OF THE INVENTION

It is therefore an object of the present invention to provide a library system which solves the problem wherein a failure in the recording and reproducing unit disables use of units up to the carrying apparatus and ensures that failure in the recording and reproducing unit does not disable the operation of the carrying apparatus by detecting operations of the system as a whole with a detector provided in the side of recording and reproducing unit.

It is another object of the present invention to provide a library system which suppresses increase in quantity of communication between the recording and reproducing unit and the carrying apparatus through a director during exchange of data between the recording and reproducing unit and the carrying apparatus.

In order to attain such objects, a library system 2 for automatically loading, ejecting or storing recording mediums conforming to the instruction issued from the control system 1 and executing recording and reproduction of data is formed, as shown in FIG. 5, and is structured by comprising a recording medium keeping means 51 for keeping a large amount of recording mediums, a recording and reproducing unit 52 for loading or ejecting the recording mediums and the recording or reproducing data to or from recording mediums, a carrying apparatus for carrying recording medium between the store house 51 of the recording mediums and the recording and reproducing unit 52, a recording control unit 54 for making communication with the control system 1 and controlling the library system 2 as a whole including the recording and reproducing unit 52 and the carrying apparatus 53, and, moreover, a first communication line 54a for transmitting instructions between the recording control unit 54 and the recording and reproducing unit 52, a second communication line 54b for transmitting instructions between the recording and control unit 54 and the carrying apparatus 53 and a third communication line 55 for transmitting instructions between the recording and reproducing unit 52 and the carrying apparatus 53.

In addition, the carrying apparatus 53 transfers a recording medium to the recording and reproducing unit 52 and removes it therefrom and then instructs the loading of the recording medium to the recording and reproducing unit 52. The recording and reproducing unit 52 receives the loading instruction and loads a recording medium to the recording and reproducing position. At the time of ejecting a recording medium, the recording and reproducing unit 52 instructs the carrying apparatus 53 to store a recording medium to the store house 52. The tranfer unit 53 receives an instruction for storing a recording medium, takes out a recording medium from the recording and reproducing unit 52, retires up to the predetermined position and thereafter issues a message informing completion of ejection of the recording medium to the recording and reproducing unit 52. Upon reception of such message, the recording and reproducing unit 52 enters the condition of waiting for loading of the recording medium. It is desirable that such operations are carried out between the recording and reproducing unit 52 and carrying apparatus 53.

DESCRIPTION OF THE DRAWINGS

FIG. 1 is a diagram indicating a library system as a whole;

FIG. 2 indicates a carrying apparatus;

FIGS. 6 to 6" are a flowchart for explaining loading operation of a recording medium in FIG. 6;

FIGS. 7 to 7" are a flowchart for explaining ejecting operation of a recording medium in FIG. 6;

EMBODIMENT OF THE INVENTION

Figure 3:
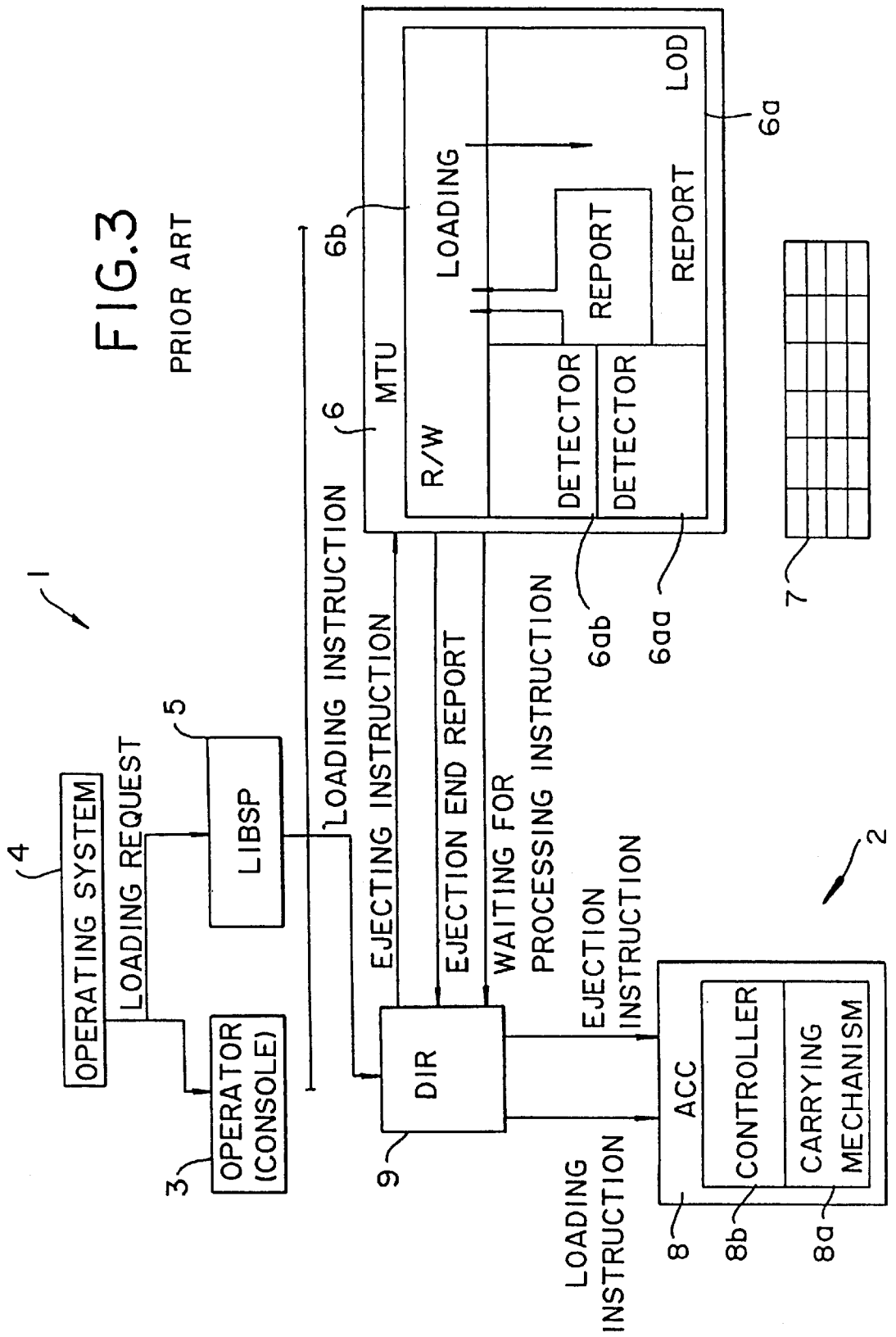
FIG. 3 is a control block diagram of the conventional library system.
Figure 4:
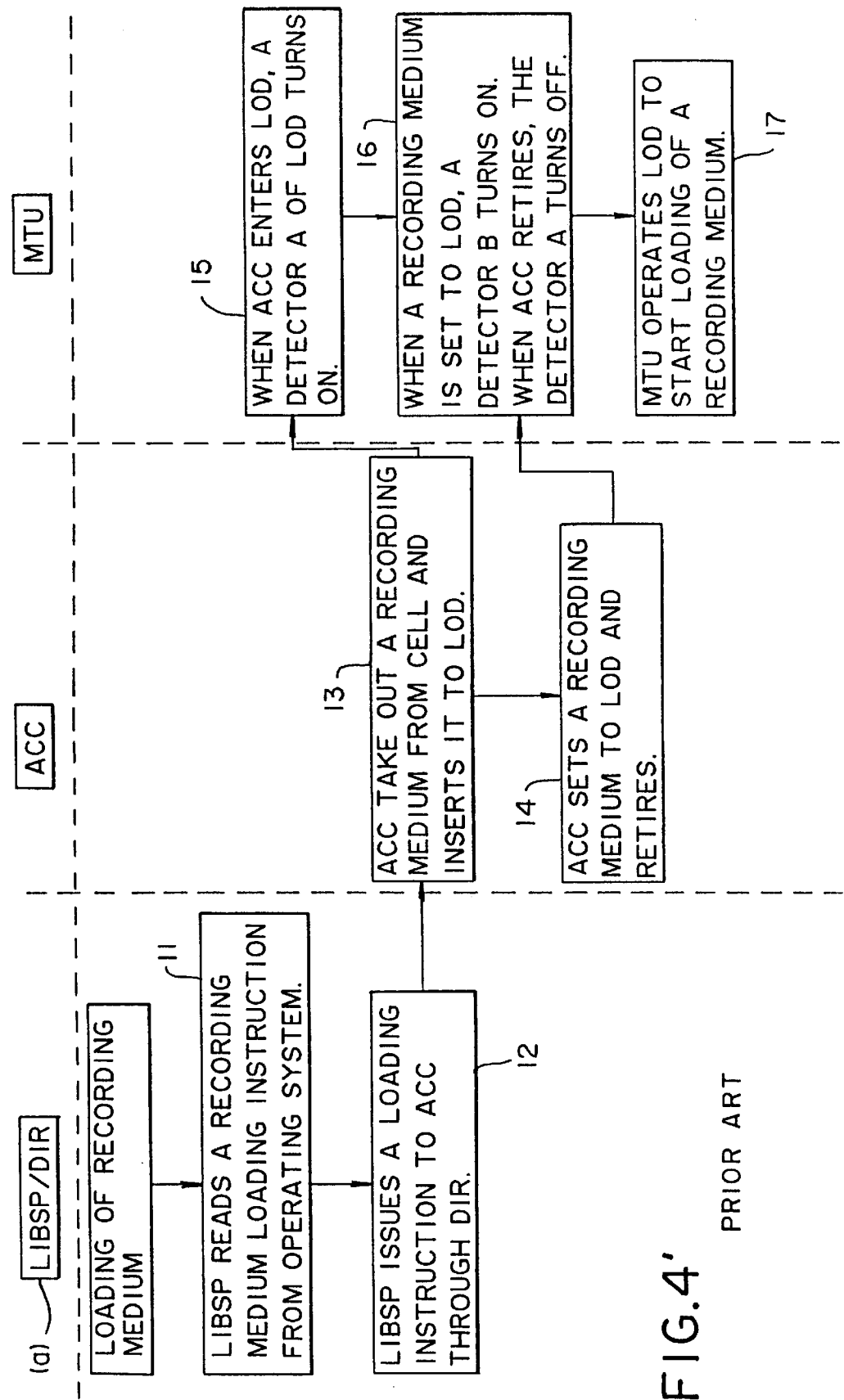
FIGS. 4 to 4" are a flowchart of conventional operation control for explaining loading and ejection of a recording medium.
Figure 5:
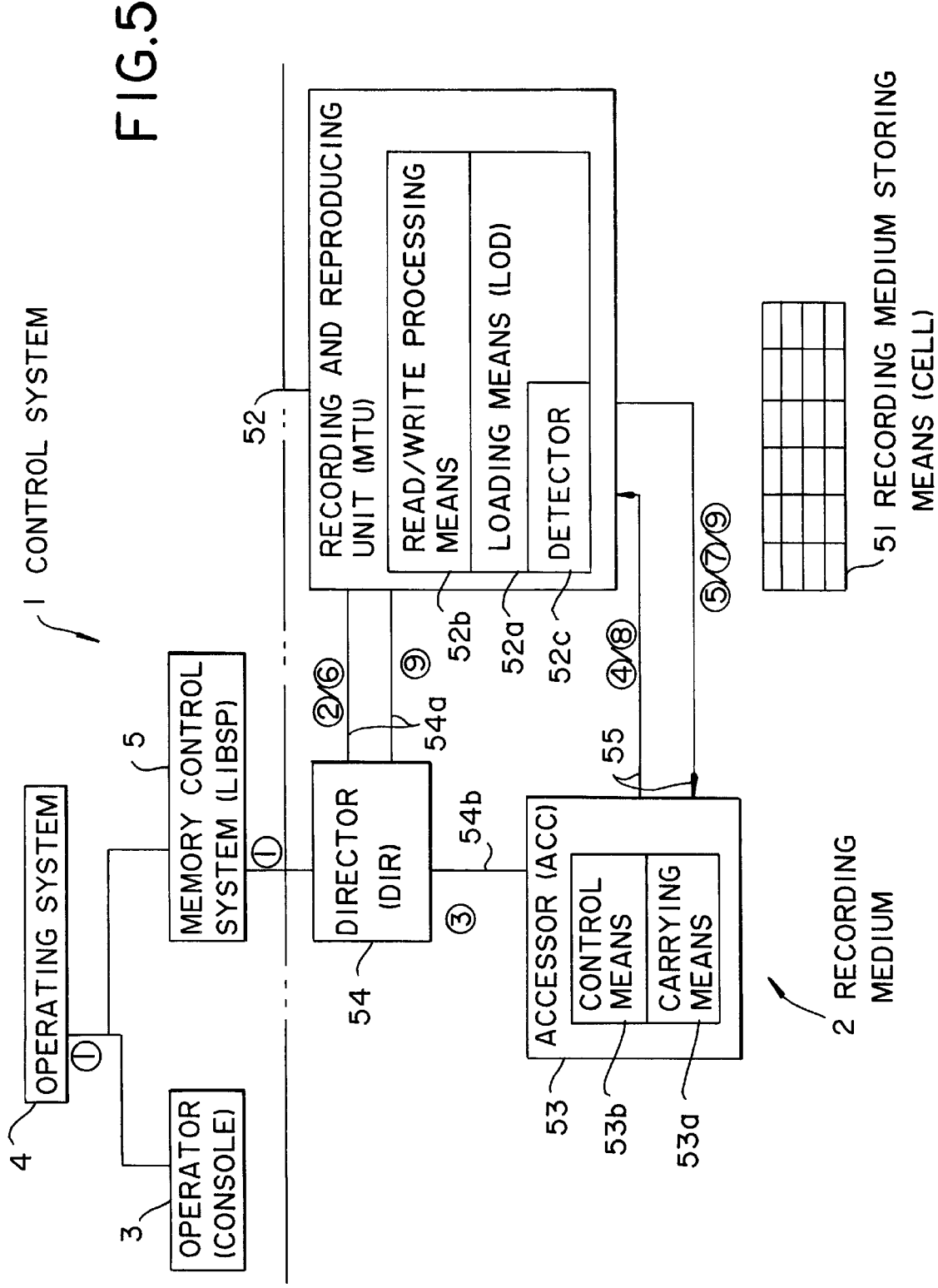
FIG. 5 is a diagram indicating a first embodiment of the present invention.

As an embodiment of the present invention, a magnetic tape library system utilizing a cartridge type magnetic tape as a recording medium is shown in FIG. 5.

The control system 1 comprises an operating system (hereinafter abbreviated as OS), an operator console 3 and a recording unit control system (hereinafter abbreviated as LIBSP) 5.

The library system 20 comprises a store house 51 for storing a large number of recording mediums, a magnetic tape unit (hereinafter abbreviated as MTU) 52 for recording and reproducing data to or from a recording medium, an accessor (hereinafter abbreviated as ACC) 53 for carrying the recording mediums between the store house 51 and MTU 52 and a director (hereinafter abbreviated as DIR) 54 for making communication with the control system 1 and controlling the library system as a whole including MTU 52 and ACC 53. Moreover, a first communication line 54a for transmitting instructions between DIR 54 and MTU 52, a second communication line 54b for transmitting instructions between DIR 54 and ACC 53 and a third communication line 55 for transmitting instructions between MTU 52 and ACC 53 are also provided.

A flowchart of the controlling of the loading operation for the recording mediums of such a library system 20 is shown in FIG. 6. First, a recording medium loading request is issued to a console 3 and LIBSP 5; LIBSP 5 reads the content of such a request and issues a loading instruction to DIR 54 of the library system 20 (step 61).

In case a plurality of MTUs 52 are provided for the library system 20, DIR 54 selects an MTU 52 to be used (step 62) and issues a recording medium loading instruction to ACC 53 (step 63). The MTU 52 selected by DIR 54 enters the condition of waiting for the insertion of a recording medium (step 64).

Upon reception of the loading instruction, ACC 53 takes out a requested recording medium from the store house 51 by operating the carrying means 53a for actually transferring the recording medium and inserts it to a loading means (hereinafter abbreviated as LOD) 52a which deals with the recording medium between MTU 52 and ACC 53 (step 65).

After inserting a recording medium to LOD 52a, the accessing means 53a of ACC 53 retires from LOD 52a (step 66) and a control means 53b of ACC 53 issues a recording medium loading instruction to MTU 52 (step 67).

At the time of insertion of a recording medium, the detector 52c turns ON by detecting insertion of the recording medium, and MTU 52 enters the condition of accepting a recording medium (step 68). Conforming to a loading instruction issued from ACC 53, a recording medium is moved to a read/write processing part 52b from MOD 52a in MTU 52 for actual read or write operation 9 (step 69). When a recording medium is loaded to the read/write processing part 52b, it is reported to ACC 53 by a message and the detector 52c turns OFF.

Next, a flowchart illustrating the controlling ejecting and storing operations of the recording mediums is shown in FIG. 7. First, LIBSP 5 issues a recording medium ejecting and storing request to DIR 54 of the library system 2 (step 71) and DIR 54 having received such request issues an ejecting request to MTU 54 (step 74) and a storing request to ACC 53 (step 73).

Upon receiving an ejecting request, MTU 522 ejects a recording medium to LOD 52a from the read/write processing part 52b. When the detector 52c turns ON, MTU 52 reports to ACC 53 through a communication line 55 the end of the ejection after the ejection of a recording medium (step 74).

ACC 53, having received the ejection end message, takes out a recording medium from LOD 52a by operating the carrying means 53a and stores it into a store house 51 (step 75). After storing, the ACC 53 reports end of the ejection of the recording medium to MTU 52 (step 76).

Upon reception of the ejection end report, the MTU 52 enters the condition to wait for insertion of a recording medium, notifying that it is in the condition of waiting for insertion of a recording medium to ACC 53 and DIR 54 (step 78).

When ACC 53 receives the notification indicating the condition to wait for insertion of a recording medium, it shifts to the next processing (step 79). Moreover, DIR 54, which has also received the notification indicating the condition to wait for insertion of a recording medium from MTU 52, also shifts to the next processing 9 (step 80).

In case a recording medium is carried between MTU 52 and store house 51 by ACC by such procedures, data is exchanged through communication between MTU 52 and ACC 53, operation sequence is mutually restricted to avoid malfunction, and loading, ejection or storing of recording medium can be realized quickly and reliably.

Figure 8:
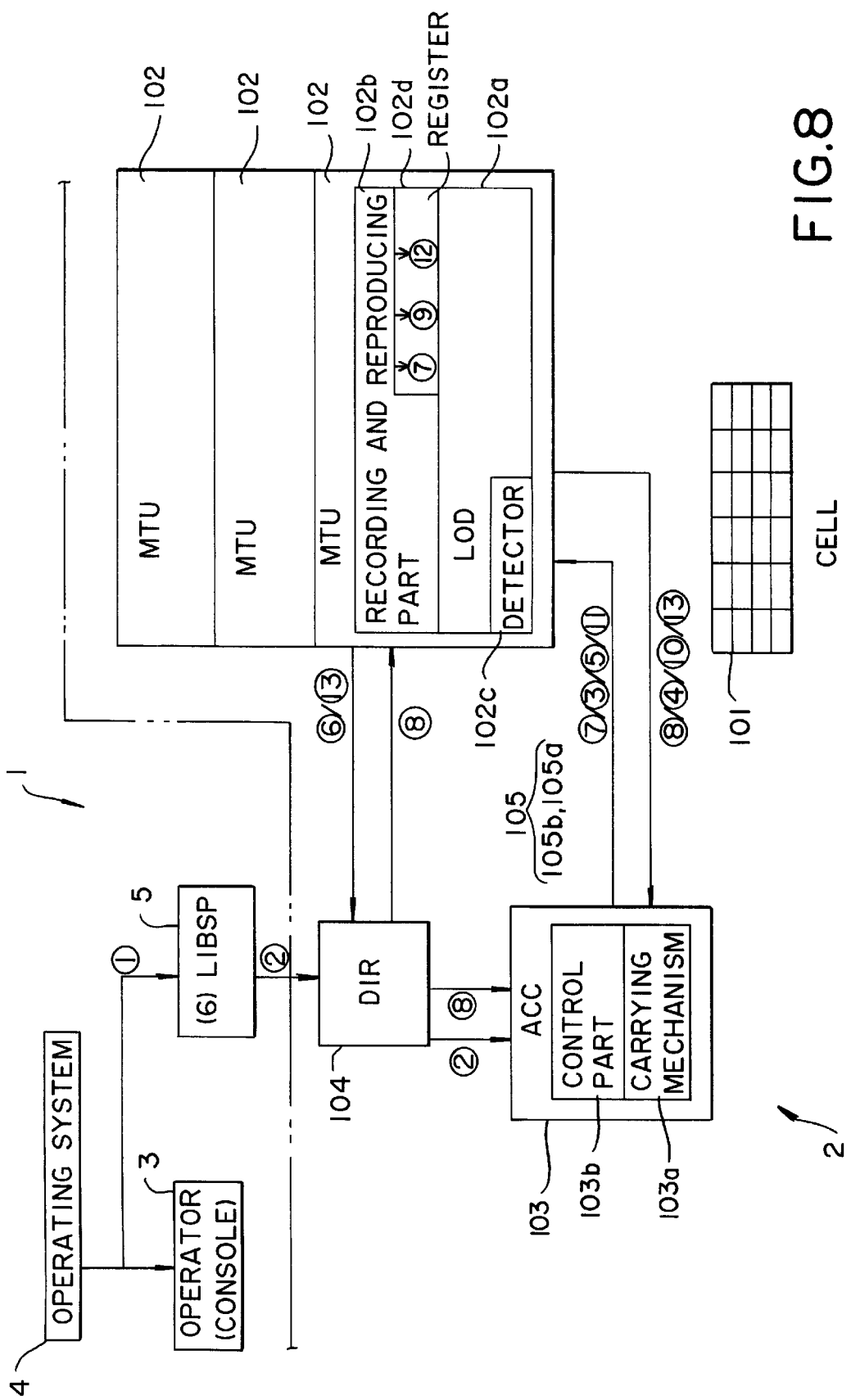
FIG. 8 is a diagram indicating a second embodiment of the present invention.

Next, a second embodiment is shown in FIG. 8. The control system 1 is similar to that of FIG. 5. A magnetic tape library unit 200 comprises a store house 101 for storing many magnetic tapes housed within a cartridge, a plurality of magnetic tape units 102 (hereinafter abbreviated as MTU) for reading and writing data to and/or from a magnetic tape, an accessor 103 (hereinafter abbreviated as ACC) for moving a magnetic tape between the store house 101 and MTU 52 and a director 104 (hereinafter abbreviated as DIR) for controlling MTU 102 and ACC 103 and the accessor 103 and magnetic tape unit MTU 102 are connected for mutual communication through the communication line 105.

MTU 102 comprises a loading part 102a (hereinafter abbreviated as LOD) for dealing with a magnetic tape from ACC 103 and a read/write part 102b for reading or writing data from or to a magnetic tape. Moreover, LOD 102a comprises a detector 102c for detecting whether a magnetic tape is loaded or not loaded, the read/write part 102b comprises a register 102d for writing the data to reporting the operating condition to ACC 103 and transmits the waiting data, ejection end data to the side of ACC 103 through the ejection end sending line 105b of the communication means 105.

ACC 103 comprises an ACC mechanism 103a for moving a magnetic tape without intervention of operator and an ACC control part 103b for controlling operation of the carrying mechanism 103a and making communication with the side of MTU 102 and the ACC control part 103b transmits MTU selection data, loading instruction, ejecting instruction or ejection end data to MTU 102 through the loading instruction transmitting line 105a of the communication line 105.

DIR 104 is a microprogrammed control unit which controls ACC 103 and MTU 102 to process commands for the host side units. The commands of library system 200 are classified for accessor and recording and reproducing unit. These commands are input to DIR 104 from an operating system 4 (hereinafter abbreviated as OS) through LIBSP 5 (library support program).

Figure 9:
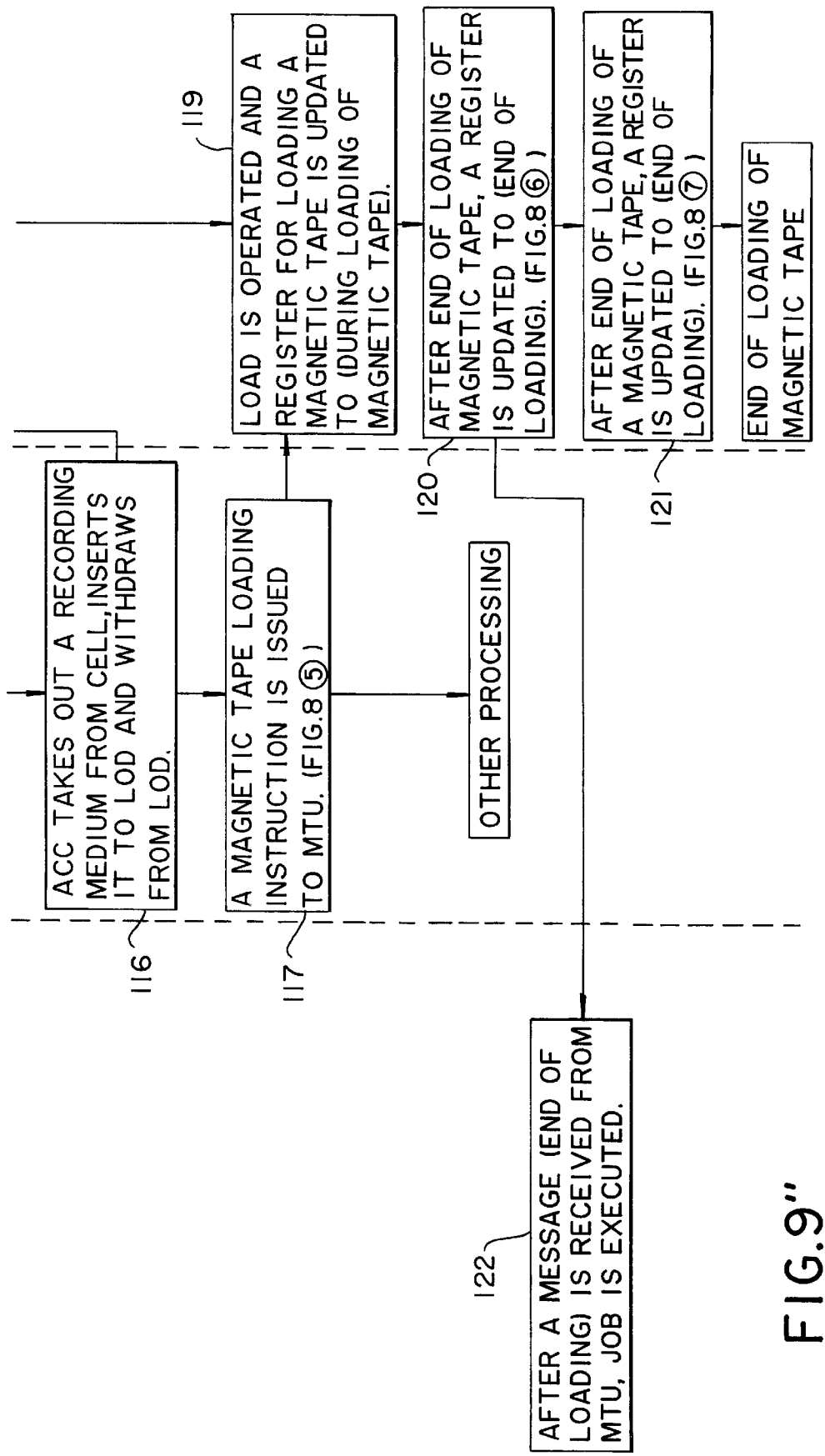
FIGS. 9 to 9" are a flowchart for explaining loading operation of a recording medium in FIG. 8.

In succession, a flowchart illustrating the controlling of the magnetic tape loading operation of the magnetic tape library system 200 is shown in FIG. 9. First, when a magnetic tape loading request is issued from OS 4, LIBSP 5 reads such request (step 111).

LIBSP 5 obtains an address of magnetic tape within the store house 101 responding to such loading request and transmits a MOVE command for moving the magnetic tape to MTU 102 to DIR 104. Thereafter, DIR 104 obtains MTU 102 for which a magnetic tape must inserted, depending on using condition of MTU 102 and transmits the MOVE command including address of magnetic tape and device number of MTU 102 to ACC 103.

Upon reception of MOVE command from DIR 104, ACC 103 transmits an MTU condition check instruction for checking the processing condition of MTU 102 to it for which a magnetic tape must be inserted through the communication line 105a and waits for an answer from MTU 102 (step 113).

MTU 102, when it receives the MTU condition check instruction from ACC 103, judges whether it is in the condition to wait for insertion of a tape or in the read or write operation for the magnetic tape and returns the condition data as the response to ACC 103 (step 114).

Here, it is usually unbelievable that the data indicating read or write processing operation is returned from MTU 102 for such MTU condition check instruction because when DIR 104 issues the MOVE command to ACC 103, DIR 104 instructs MTU under the condition to wait for insertion of magnetic tape. Therefore, if MTU under the read or write processing is designated, it has been impossible to detect the MTU under the read or write processing condition until insertion of magnetic tape is attempted by ACC to the designated MTU and such attempts fails. However, in the case of the present invention, ACC 23 confirms the processing condition of MTU to which a magnetic tape must be inserted with the communication line 105 before movement of magnetic tape and therefore, if any failure is generated, the magnetic tape is not inserted to MTU under the read or write processing.

Thereafter, ACC 103 takes out the designated magnetic tape from the store house 101, after checking that the answer from MTU 102 indicates the condition to wait for insertion of magnetic tape (step 115), loads such magnetic tape to LOD 102a of the designated MTU 102, then sets the magnetic tape to LOD 24a and retires from LOD 102a (step 116).

After ACC 103 has retired, it transmits a magnetic tape loading instruction to MTU 102 through a communication line 105a (step 117).

When the magnetic tape is inserted to LOD 102a by ACC 103, the detector 102c turns ON and MTU 102 notifies it to the read/write processing part 102b to update content of register 102d to "magnetic tape inserted" (step 118). Thereafter, upon reception of a loading instruction from ACC 103, the read/write processing part 102b operates LOD 102a to load the magnetic tape and updates content of register 102d to "loading of magnetic tape" (step 119).

Upon loading of the magnetic tape, the read/write processing part 102b notifies end of loading and condition to wait for instruction to DIR 104 (step 120), updates content of register 102d to "end of loading and condition to wait for processing instruction" and waits for the next processing instruction (step 121).

DIR 104, having received the message indicating end of loading and condition to wait for processing instruction, executes the next job (step 122).

Figure 10:
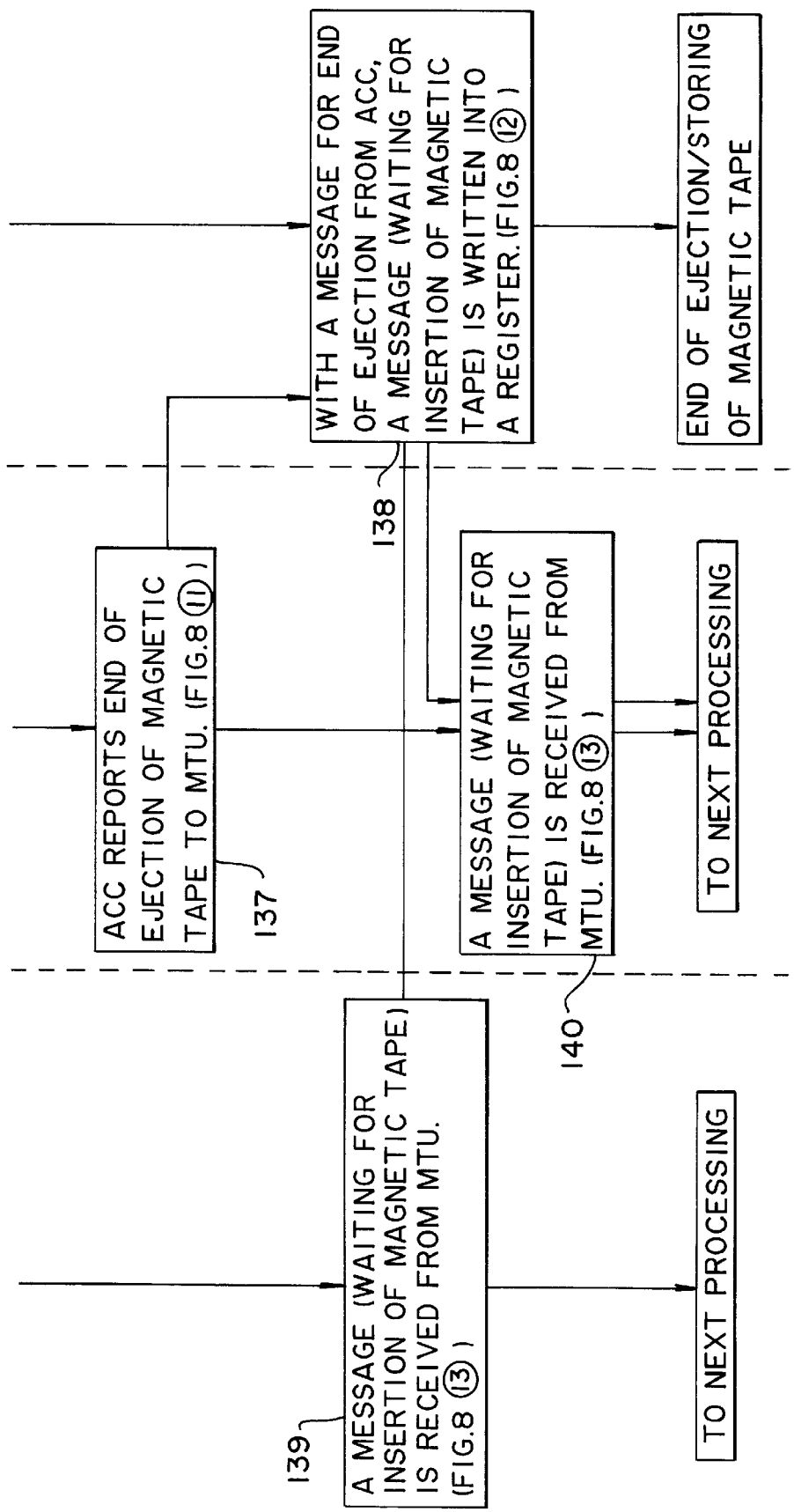
FIGS. 10 to 10" are a flowchart for explaining ejecting operation of a recording medium in FIG. 8.

Next, a flowchart of controlling ejecting and storing operations of magnetic tape is shown in FIG. 10. First, when an ejection and storing request is issued from OS4, LIBSP 5 reads such instruction. LIBSP 5 then issues an ejection/storing request for the magnetic tape having completed the processing to DIR 104 depending on such request (step 131), issues an ejection request to MTU 102 through DIR 104 and also issues a storing request to ACC 103 (step 132).

After the read/write processing part 102b reads the ejection request issued from DIR 104 and ejects the magnetic tape to LOD 102a, updates content of register 102d to "end of ejection" (step 134). Content of this register 102d is not updated until a message indicating end of ejection is transmitted from ACC 103 (step 135).

ACC 103 having received the storing request from DIR 104 drives a carrying mechanism 103a to take out a magnetic tape from LOD 102a of MTU 102, then moves to the store house 101, stores a magnetic tape thereto step (136) and notifies the end of ejection message to MTU 102 through the line 105a after storing the tape (step 137).

MTU 102 updates content of register 102d to "operation to wait for a magnetic tape" (step 138) after receiving the end of ejection message from the side of ACC 103, returns a message indicating the condition to wait for a magnetic tape to DIR 104 (step 139) and also returns a message indicating the condition to wait for a magnetic tape to the side of ACC 103 through the transmission line 105b (step 140).

In such library system 200, the loading operation of MTU 102 is started when a signal is input from ACC 103, and the condition to wait for a magnetic tape is generated after receiving a message for the end of ejection from ACC 103 after the end of ejection. Therefore, if the carrying mechanism 103a operates to set again the magnetic tape, MTU 102 does not start the next operation unless a message is transmitted from ACC 103. Thereby, malfunction by mutual interference is not generated, preventing generation of failure. Moreover, a detector for detecting existence of carrying mechanism 103a is not provided and thereby a failure due to defective detector can also be avoided.

In addition, a magnetic tape can be loaded or ejected only by a discrete unit by comprising a firmware into MTU 102 so that MTU 102 operates after ACC 103 generates a loading or ejecting instruction.

EFFECT OF THE INVENTION

As explained above, the present invention connects the recording and reproducing unit 52 and the accessor 53 for communication and exchanges data through communication between the recording and reproducing unit 52 and accessor 53, in the case of moving a recording medium between the recording and reproducing unit 52 and store house 51 of recording medium with the carrying means 53, does not allow increase of load of director 54 and quickly and reliably realizes loading, ejection or storing of recording medium.

Moreover, the recording and reproducing unit 52 starts the loading operation when the signal is transmitted from the accessor 53 and the recording and reproducing unit 52 accepts the next processing after the end of ejection after receiving a report for the end of ejection from the accessor 53. Therefore, even when the accessor 53 sets again the recording medium, the recording and reproducing unit 52 does not operate unless the message indicating the end of ejection is received from the accessor 53. Thereby, malfunction can be avoided.

In case the operating system 4 cannot issue a recording medium loading or ejecting instruction during maintenance or self function diagnostic process, the library system can load or eject a recording medium by itself by issuing the loading or ejecting instruction from the accessor 53 and forming a firmware so that the recording and reproducing unit operates conforming to such instruction.

In addition, the recording and reproducing unit 52 comprises a read/write processing means 52b, while the accessor 52 comprises a control means 53b and the recording and reproducing unit 52 and accessor 53 are connected for communication. Accordingly, the operating data during mutual execution can be transmitted as required and adequate operation can be executed reliably during loading or ejection of recording medium in the recording and reproducing unit 52, or carrying of recording medium by the carrying means 53 or during ejection of recording medium from the loading unit 52a.

What is claimed is:

1. A library system, comprising:

storing means (51) for storing a plurality of recording mediums;

recording and reproducing means (52) for recording and reproducing data to and from the recording mediums;

carrying means (53) for moving the recording mediums between said storing means (51) and said recording and reproducing means (52);

control means (54) for controlling said recording and reproducing means (52) and for controlling said carrying means (53);

first communication means (54a) for transmitting instructions between said control means and said recording and reproducing means;

second communication means (54b) for transmitting instructions between said control means and said carrying means; and third communication means (55) for transmitting electrical instruction signals from said carrying means to said recording and reproducing means indicating that the recording medium is ready to be loaded into said recording and reproducing means and from said recording and reproducing means to said carrying means indicating that the recording medium is ready to be unloaded from said recording and reproducing means, said third communication means being separate frog said control means.

2. A library system according to claim 1, wherein said first communication means (54a) transmits reading and writing instructions for the recording mediums to said recording and reproducing means (52) from said control means (54); said second communication means (54b) transmits carrying instructions for the recording mediums to said carrying mechanism (53) from said control means (54); and said third communication means (55) transmits operating conditions between said recording and reproducing means (52) and said carrying means (53).

3. A library system according to claim 2, wherein said carrying means (53) includes a means for reporting an end of ejection of a recording medium to said recording and reproducing means (52) when said carrying means removes the recording medium from said recording and reproducing means (52) and then withdraws to a determined position.

4. A library system according to claim 3, wherein said recording and reproducing means (52) includes a means for setting said recording and reproducing means (52) to a condition of waiting for a recording medium loading instruction when the recording and reproducing means has received the reporting of the end of ejection of the recording medium from said carrying means (53).

5. A library system according to claim 1, wherein said carrying means (53) includes means for transmitting an instruction to load at least one of said recording mediums to said recording and reproducing means (52) through said third communication means (55) when said carrying means has transferred the at least one recording medium to said recording and reproducing means (52) and retires to a predetermined position.

6. A library system according to claim 1, wherein said recording and reproducing means (52) includes a loading means for receiving a loading instruction from said carrying means (53) through the third communication means (55) and for loading the at least one recording medium to a read/write position.

7. A library system according to claim 1, wherein said carrying means (53) includes a means for sending a message for indicating an end of ejection of a recording medium to said recording and reproducing means (52) through said third communication means (55) when said carrying means (53) removes the recording medium from said recording and reproducing means (52) and withdraws to a predetermined position.

8. A library system according to claim 5, wherein said recording and reproducing means (52) includes a means for setting said recording and reproducing means (52) to a condition of waiting for a recording medium loading instruction when it has received the recording medium ejection end message from said carrying means (53) through the third communication means (55).

9. A library system according to claim 8, wherein said carrying means (53) further includes a means for transmitting an instruction to load at least one of said recording mediums to a read/write position to said recording and reproducing means (52) when said carrying means carries said at least one recording medium to said recording and reproducing means (52) and withdraws to a determined position.

10. A library system according to claim 8, wherein said recording and reproducing means (52) includes a means for receiving a loading instruction from said carrying means (53) and for loading said recording medium to a read/write position.

11. A library system, comprising:
    storing means (51) for storing a plurality of recording mediums;
    recording and reproducing means (52) for reading and writing data from and to the recording mediums;
    carrying means (53) for transferring the recording mediums between said recording and reproducing means (52) and said storing means (51);
    control means (54) for controlling said recording and reproducing means (52) and said carrying means (53);
    said recording and reproducing means (52) including means for transmitting electrical instruction signals containing operating information directly to said carrying means (53) and means for executing processings depending on a message sent from said carrying means (53); and
    said carrying means (53) including means for transmitting electrical instruction signals containing operating information directly to said recording and reproducing means (52) and means for executing processings depending on a message sent from said recording and reproducing means (52).

12. A method of controlling a library system which includes storing means (51) for storing a plurality of recording mediums, recording and reproducing means (52) for reading and writing data from and to the recording mediums, and carrying means (53) for carrying the recording mediums between said recording and reproducing means (52) and said storing means (51);
    said recording and reproducing means (52) performing the steps of:
        loading a recording medium carried from said carrying means (53) to a loading means in the recording and reproducing means;
        receiving an electrical loading instruction signal indicating that the recording medium is ready to be loaded into said recording reproducing means, directly from said carrying means (53); and
    loading said recording medium to the read/write position after receiving the electrical loading instruction signal.

13. A method of controlling a library system which includes storing means (51) for storing a plurality of recording mediums, recording and reproducing means (52) for reading and writing data from and to a recording medium and carrying means (53) for carrying the recording mediums between said recording and reproducing means (52) and said storing means (51);
    said carrying means (53) performing the steps of:
        carrying a recording medium to said recording and reproducing means (52);
        loading said recording medium to said recording and reproducing means (52);
        retiring said carrying means (53) from said recording and reproducing means (52) after loading said recording medium; and
    transmitting a recording medium electrical loading instruction signal, indicating that the recording medium is ready to be loaded into said recording and reproducing means, directly to said recording and reproducing means (52) after retiring said carrying means (53) from said recording and reproducing means (52).

14. A method of controlling a library system which includes storing means (51) for storing a plurality of recording mediums, recording and reproducing means (52) for reading and writing data from and to the recording mediums and carrying means (53) for carrying the recording mediums between said recording and reproducing means (52) and said storing means (51);
    said recording and reproducing means (52) performing the steps of;
    loading a recording medium to said carrying means (53);
    receiving a recording medium ejection electrical and signal, indicating an end of ejection of the recording medium, directly from said carrying means (53); and
    setting said carrying means (53) to a condition of waiting for a recording medium electrical loading instruction signal after receiving said recording medium ejection electrical end signal.

15. A method of controlling a library system which includes storing means (51) for storing a plurality of recording mediums, recording and reproducing means (52) for reading and writing data from and to the recording mediums and carrying means (53) for transferring the recording mediums between said recording and reproducing means (52) and said storing means (51);
    said carrying means (53) performing the steps of:
    receiving a recording medium from said recording and reproducing means (52);
    retiring to a determined position from said recording and reproducing means (52); and
    transmitting a recording medium ejection electrical end signal, indicating an end of ejection of the recording medium, directly to said recording and reproducing means (52) after retiring to the determined position.

16. A method of controlling a library system, comprising the steps of:
    (A) providing: a library system which includes storing means (51) for storing a plurality of recording mediums, recording and reproducing means for reading and writing data from and to the recording mediums, and carrying means (53) for carrying the recording mediums between said recording and reproducing means (52) and said storing means (51);

(B) said carrying means (53) performing the steps of:
  (a) carrying a recording medium to said recording and reproducing means (52);
  (b) loading said recording medium to said recording and reproducing means (52);
  (c) retiring from said recording and reproducing means (52) after loading said recording medium; and
  (d) transmitting a recording medium electrical loading instruction signal, indicating that the recording medium is ready to be loaded into said recording and reproducing means, directly to said recording and reproducing means (52) after retiring from said recording and reproducing means (52); and (C) said recording and reproducing means (52) performing the steps of:
  (a) loading the recording medium carried from said carrying means (53) to a loading means in the recording and reproducing means;
  (b) receiving the electrical loading instruction signal from said carrying means (53); and
  (c) loading said recording medium to the read/write position after receiving the electrical loading instruction signal.

17. A method of controlling a library system, comprising the steps of:

(A) providing library system which includes storing means (51) for storing a plurality of recording mediums, recording and reproducing means (52) for reading and writing data from and to the recording mediums and carrying means (53) for carrying the recording mediums between said recording and reproducing means (52) and said storing means (51);

(B) said carrying means (53) performing the steps of:
  (a) receiving a recording medium from said recording and reproducing means (52);
  (b) retiring to a determined position from said recording and reproducing means (52); and
  (c) transmitting a recording medium ejection electrical end signal, indicating an end of ejection of the recording medium, directly to said recording and reproducing means (52) after retiring to the determined position; and (C) said recording and reproducing means (52) performing the steps of:
  (a) loading the recording medium to said carrying means (53);
  (b) receiving the recording medium ejection electrical end signal from said carrying means (53); and
  (c) setting said carrying means (53) to a condition of waiting for a recording medium electrical loading instruction signal after receiving said recording medium ejection electrical end signal.

\* \* \* \* \*